United States Patent
Kovacs

(10) Patent No.: US 7,448,019 B2
(45) Date of Patent: Nov. 4, 2008

(54) DYNAMIC READJUSTMENT AND INTERPOLATION OF PROGRESS METHOD AND SYSTEM

(75) Inventor: Nicholas R. Kovacs, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/304,021

(22) Filed: Dec. 15, 2005

(65) Prior Publication Data

US 2007/0220238 A1 Sep. 20, 2007

(51) Int. Cl.
G06F 9/44 (2006.01)
(52) U.S. Cl. ..................................................... 717/100
(58) Field of Classification Search ................ 717/100, 717/174; 708/290
See application file for complete search history.

(56) References Cited

U.S. PATENT DOCUMENTS

| | | | |
|---|---|---|---|
| 5,918,226 A * | 6/1999 | Tarumi et al. ................. | 707/10 |
| 5,930,803 A * | 7/1999 | Becker et al. ............. | 707/104.1 |
| 6,239,800 B1 * | 5/2001 | Mayhew et al. ............. | 715/764 |
| 6,275,987 B1 * | 8/2001 | Fraley et al. ................ | 717/127 |
| 6,639,687 B1 * | 10/2003 | Neilsen ....................... | 358/1.14 |
| 6,865,717 B2 * | 3/2005 | Wright ........................ | 715/772 |
| 6,901,558 B1 * | 5/2005 | Andreas et al. ............. | 715/772 |
| 7,047,091 B2 * | 5/2006 | Maschke ...................... | 700/83 |
| 7,103,847 B2 * | 9/2006 | Alford et al. ................ | 715/772 |
| 7,110,995 B2 * | 9/2006 | Kirkland ........................ | 707/3 |
| 7,171,628 B1 * | 1/2007 | Perttunen ..................... | 715/853 |
| 7,219,145 B2 * | 5/2007 | Chmaytelli et al. ......... | 709/224 |
| 2001/0055017 A1 * | 12/2001 | Ording ........................ | 345/440 |
| 2003/0187526 A1 * | 10/2003 | Wright ........................ | 700/94 |
| 2003/0233387 A1 * | 12/2003 | Watanabe et al. ........... | 709/100 |
| 2006/0044307 A1 * | 3/2006 | Song ........................... | 345/419 |

OTHER PUBLICATIONS

Conrad, Frederick; Couper, Mick; Tourangeau, Roger; Peytchev, Andrey; "Impact of Progress Feedback on Task Completion: First Impressions Matter", Apr. 2005, ACM p. 1921-1924, retrieved Feb. 12, 2008.*
Luo, Gang; Naughton, Jeffrey F; Ellmann, Curt J; Watzke, Michael W; "Toward a Progress Indicator for Database Queries", Jun. 2004, ACM, retrieved Feb. 12, 2008.*
Haslum, Patrik; Geffner, Hector; "Heuristic Planning with Time and Resources", 2001 Proceedings of ECP, retrieved via scholar.google.com search Feb. 12, 2008.*

(Continued)

*Primary Examiner*—Wei Y. Zhen
*Assistant Examiner*—Philip R. Wang
(74) *Attorney, Agent, or Firm*—Cardinal Law Group

(57) ABSTRACT

A method for readjusting and interpolating a progress of an execution of multi-step program by a computing device involves a computation of a cumulative point baseline for each step of the multi-step program based on a completion time baseline for each step of the multi-step program, and a regulation of a progress indicator based on the cumulative point baseline and a completion time of each step of the multi-step program as executed by the computing device. The multi-program is an application program or operating program executable in steps by any type of computing device. The progress indicator can have any form, particularly the form of a progress bar.

5 Claims, 5 Drawing Sheets

TABLE 47 (S42)

| STEP i/n | CTB |
|---|---|
| STEP 1/5 | 10 |
| STEP 2/5 | 60 |
| STEP 3/5 | 30 |
| STEP 4/5 | 100 |
| STEP 5/5 | 40 |

→

TABLE 48 (S44)

| STEP i/n | CTP |
|---|---|
| STEP 1/5 | 10,000 |
| STEP 2/5 | 60,000 |
| STEP 3/5 | 30,000 |
| STEP 4/5 | 100,000 |
| STEP 5/5 | 40,000 |

→

TABLE 49 (S46)

| STEP i/n | CPB |
|---|---|
| STEP 1/5 | 10,000 |
| STEP 2/5 | 70,000 |
| STEP 3/5 | 100,000 |
| STEP 4/5 | 200,000 |
| STEP 5/5 | 240,000 |

OTHER PUBLICATIONS

Aloul, Fadi A; Sieraski, Brian D; Sakallah, Karem A; "Satometer: How Much Have We Searched?", 2003 IEEE p. 995-1004, retrieved Feb. 12, 2008.*

Berque, Dave A; Goldberg, Mark; Edmonds, Jeffrey A; "Implementing Progress Indicators for Recursive Algorithms", 1993 ACM, p. 533-538, retrieved Feb. 12, 2008.*

Documentation for Dow Jones Desktop Express Manual of Desktop Express, written by Solutions, Inc., published by Dow Jones Software in 1987, Illustration of Message Status—Percent Complete.*

Solutions, Inc.; Documentation for Dow Jones Desktop Express; Jan. 1, 1987.

* cited by examiner

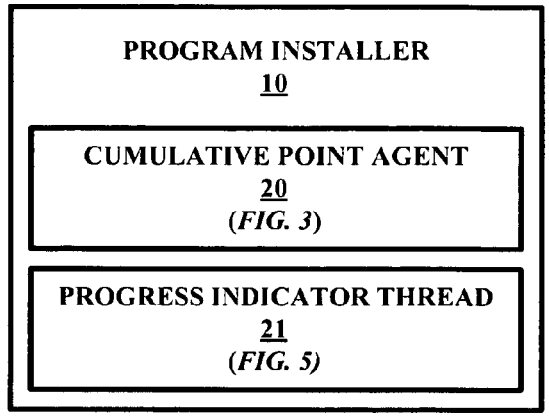
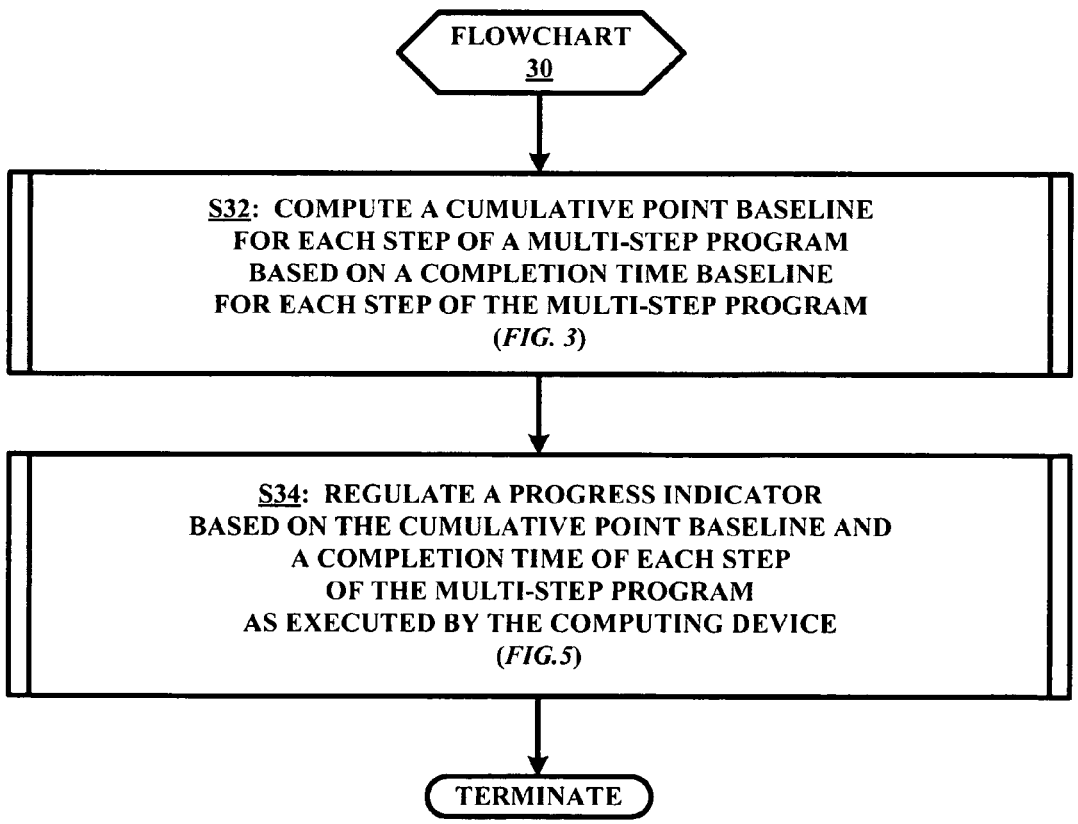

| STEP i/n | CT:CCT | pointStep | min:max | x:totalpoints | percentcomplete |
|---|---|---|---|---|---|
| STEP 1/5 | 10s:10s | 500 | 0:10,000 | 20:10,000 | 0.00%-4.17% |
| STEP 2/5 | 60s:70s | 500 | 10,000:70,000 | 140:70,000 | 4.17%-29.17% |
| STEP 3/5 | 30s:100s | 500 | 70,000:100,000 | 200:100,000 | 29.17%-41.67% |
| STEP 4/5 | 100s:200s | 500 | 100,000:200,000 | 400:200,000 | 41.67%-83.33% |
| STEP 5/5 | 40s:240s | 500 | 200,000:240,000 | 480:240,000 | 83.33%-100.00% |

FIG. 6

| STEP i/n | CT:CCT | pointStep | min:max | x:totalpoints | percentcomplete |
|---|---|---|---|---|---|
| STEP 1/5 | 5s:10s | 500 | 0:10,000 | 10:5,000 | 0.00%-4.17% |
| STEP 2/5 | 30s:35s | 1,000 | 10,000:70,000 | 70:70,000 | 4.17%-29.17% |
| STEP 3/5 | 15s:50s | 1,000 | 70,000:100,000 | 100:100,000 | 29.17%-41.67% |
| STEP 4/5 | 50s:100s | 1,000 | 100,000:200,000 | 200:200,000 | 41.67%-83.33% |
| STEP 5/5 | 20s:120s | 1,000 | 200,000:240,000 | 240:240,000 | 83.33%-100.00% |

FIG. 7

| STEP i/n | CT:CCT | pointStep | min:max | x:totalpoints | percentcomplete |
|---|---|---|---|---|---|
| STEP 1/5 | 20s:20s | 500 | 0:10,000 | 40:20,000 | 0.00%-8.33% |
| STEP 2/5 | 120s:140s | 250 | 10,000:70,000 | 280:70,000 | 8.33%-29.17% |
| STEP 3/5 | 60s:200s | 250 | 70,000:100,000 | 400:100,000 | 29.17%-41.67% |
| STEP 4/5 | 200s:400s | 250 | 100,000:200,000 | 800:200,000 | 41.67%-83.33% |
| STEP 5/5 | 80s:480s | 250 | 200,000:240,000 | 960:240,000 | 83.33%-100.00% |

FIG. 8

DYNAMIC READJUSTMENT AND INTERPOLATION OF PROGRESS METHOD AND SYSTEM

FIELD OF THE INVENTION

The present invention generally relates to a program execution of any type (e.g., an application program and an operating program) by a computing device of any type (e.g., a personal computer, a workstation, a laptop, a server, a personal data assistant, a cell phone and a smart phone). The present invention specifically relates to providing a displayable progress indicator for a program execution by the computing device where the progress indicator is dynamically regulated to accurately reflect the progress of the program execution by the computing device.

BACKGROUND OF THE INVENTION

During a long running program execution by a computing device, it is useful to provide a user of the computing device with a progress indicator to keep the user informed of the progress of the program execution. One method used for such visualization is a progress bar displayed on the computing device. A progress bar is typically a horizontal bar that visually shows the completion percentage by painting a larger portion of the bar as the progress is completed. In order to display informative progress, the computing device must be able to determine at any point in time what percent of program execution has been completed. This percentage is fed into the progress widget to determine the visualization. In the case of a progress bar, the completion percentage is used to determine how much of the bar is painted.

In many cases, a determination by the computing device of a completion percentage of a program execution isn't all that difficult. For example, when the program execution consists of numerous individual small steps, the computing device simply takes the number of steps completed and divide by the total number of steps to obtain a percentage. Certain special cases such as a file transfer are also handled fairly easily by computing devices when the total file size is known by the computing device whereby the computing device knows how much of the file has been received and divides that amount received by the total file size. However, when the program execution consists of large long running steps and/or a file transfer of an unknown size, then a determination by the computing device of a completion percentage of the program execution at any point in time becomes more difficult.

This difficulty in determining the completion percentage of the program execution at any point in time can result in a progress displayed that is too coarse in the context of spending long amounts of time at one percentage and then jumping forward in one big step to another percentage. Another resulting problem is the progress may not monotonically increase whereby the user may think progress up to that point is being undone. An additional resulting problem can be a grossly inaccurate progress display. This can be detrimental to the user, because it may be important to be as accurate as possible to enable a user to complete or initiate other tasks during the program execution.

SUMMARY OF THE INVENTION

The present invention provides a dynamic readjustment and interpolation of progress algorithm directed to interpolating the progress of each step of a program execution to obtain a finer granularity of the visual progress of the program execution.

One form of the present invention is a signal bearing medium tangibly embodying a program of machine-readable instructions executable by a processor to perform operations for readjusting and interpolating a progress of an execution of multi-step program by a computing device. The operations comprise a computation of a cumulative point baseline for each step of the multi-step program based on a completion time baseline for each step of the multi-step program, and a regulation of a progress indicator based on the cumulative point baseline and a completion time of each step of the multi-step program as executed by the computing device.

A second form of the present invention is a computing device comprising a processor and a memory storing instructions operable with the processor for readjusting and interpolating a progress of an execution of a multi-step program by the computing device. The instructions are executed for computing a cumulative point baseline for each step of the multi-step program based on a completion time baseline for each step of the multi-step program, and regulating a progress indicator based on the cumulative point baseline and a completion time of each step of the multi-step program as executed by the computing device.

A third form of the present invention is a method for readjusting and interpolating a progress of an execution of a multi-step program by a computing device. The cipher method involves a computation of a cumulative point baseline for each step of the multi-step program based on a completion time baseline for each step of the multi-step program, and a regulation of a progress indicator based on the cumulative point baseline and a completion time of each step of the multi-step program as executed by the computing device.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 1 illustrates one embodiment of a multi-step program in accordance with the present invention;

FIG. 2 illustrates a flowchart representative of one embodiment of a dynamic readjustment and interpolation of progress method in accordance with the present invention;

FIGS. 6-8 illustrates exemplary regulations of a progress indicator in accordance with FIG. 5.

DETAILED DESCRIPTION OF THE PRESENT INVENTION

Figures 3, 4:
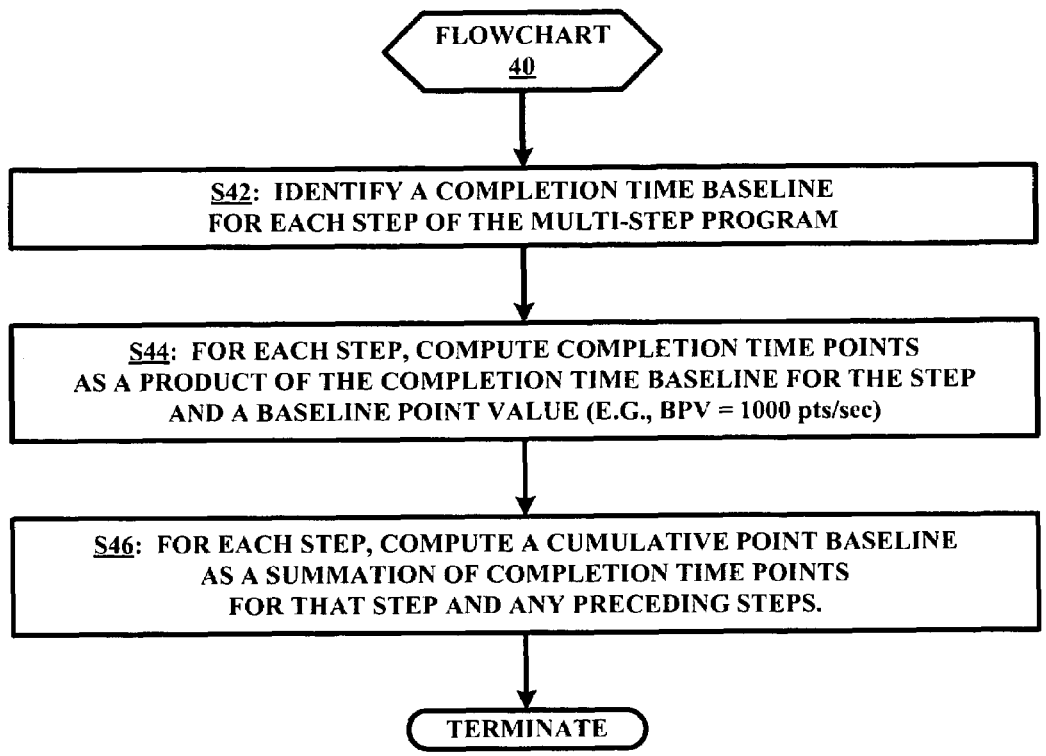
FIG. 3 illustrates a flowchart representative of one embodiment of a cumulative point baseline computation method in accordance with the present invention.
FIG. 4 illustrates an exemplary generation of a cumulative point baseline table in accordance with the flowchart illustrated in FIG. 3.

FIG. 1 illustrates a multi-step program in the form of a program installer 10 employing a cumulative point agent 20 and progress indicator thread 21 of the present invention. Program installer 10 is an operating program generally structured to install application programs on a computing device in multiple steps as would be appreciated by those having ordinary skill in the art (e.g., an installation of a spreadsheet application program on a personal computer or workstation and an installation of a instant message on a personal data assistant or a mobile phone). Program installer 10 is an operating program further structured with cumulative point agent 20 and progress indicator thread 21 to implement a dynamic readjustment and interpolation of progress method of the present invention that provides a smooth, finely tuned and monotonically increasing progress indication of each completed step of the installation of an application program on a computing device.

FIG. 2 illustrates a flowchart 30 representative of a dynamic readjustment and interpolation of progress method of the present invention. A stage S32 of flowchart 30 encompasses cumulative point agent 20 computing a cumulative point baseline for each step of program installer 10 based on a completion time baseline for each step of program installer 10, and a stage S34 of flowchart 30 encompasses progress indicator thread 21 regulating a progress indicator based on the cumulative point baseline and a completion time for each step of program installer 10 as executed by the computing device.

For purposes of the present invention, the term "completion time baseline" is broadly defined herein as real data informative of an actual completion time for executing a step of program installer 10 as run on a baseline machine. For example, an execution of program installer 10 on a baseline machine may consist of five (5) steps with a step 1 having a completion time of ten (10) seconds, a step 2 having a completion time of sixty (60) seconds, a step 3 having a completion time of thirty (30) seconds, a step 4 having a completion time of 100 seconds, and a step 5 having a completion time of forty (40) seconds.

It is not essential to the present invention that the baseline machine be any particular type of machine. It is only essential to the present invention that the baseline machine represents a typical execution of program installer 10. As such, the real data can be collected from a lower end machine or a higher end machine without significantly adversely affecting the regulation of the progress indicator.

For purposes of the present invention, the term "cumulative point baseline" is broadly defined herein as a total number of units of work required to complete a step and any preceding steps of program installer 10 where a point is a base unit of application program installation that can be accomplished by program installer 10 in a specified amount of time. For example, a point can be designated as a unit of application program installation that can be accomplished by program installer 10 in 1000 milliseconds whereby every second of installation progress by program installer 10 equals 1000 points. Thus, using the previous five (5) step example, step 1 of program installer 10 would have a cumulative point baseline of 10,000 points based on a completion time baseline of ten (10) seconds. Step 2 of program installer 10 would have a cumulative point baseline of 70,000 points based on a completion time baselines of ten (10) seconds for step 1 and sixty (60) second for step 2. Step 3 of program installer 10 would have a cumulative point baseline of 100,000 points based on a completion time baselines of ten (10) seconds for step 1, sixty (60) second for step 2 and thirty (30) seconds for step 3. Step 4 of program installer 10 would have a cumulative point baseline of 200,000 points based on a completion time baselines of ten (10) seconds for step 1, sixty (60) second for step 2, thirty (30) seconds for step 3 and 100 seconds for step 4. Step 5 of program installer 10 would have a cumulative point baseline of 240,000 points based on a completion time baselines of ten (10) seconds for step 1, sixty (60) second for step 2, thirty (30) seconds for step 3, 100 seconds for step 4 and forty (40) seconds for step 5.

It is not essential to the present invention that a chosen point value must be within any particular numerical range (e.g., the point value must be a unit of work that can be done between 1,000 milliseconds and 10,000 milliseconds). Nonetheless, it is advantageous to the present invention that the point value be reflective of a fundamental amount of work that can be accomplished in a specified period of time as related to an execution of the multi-step program (e.g., a point value of a unit of installation progress that can be done 1,000 milliseconds by program installer 10).

Figure 5:
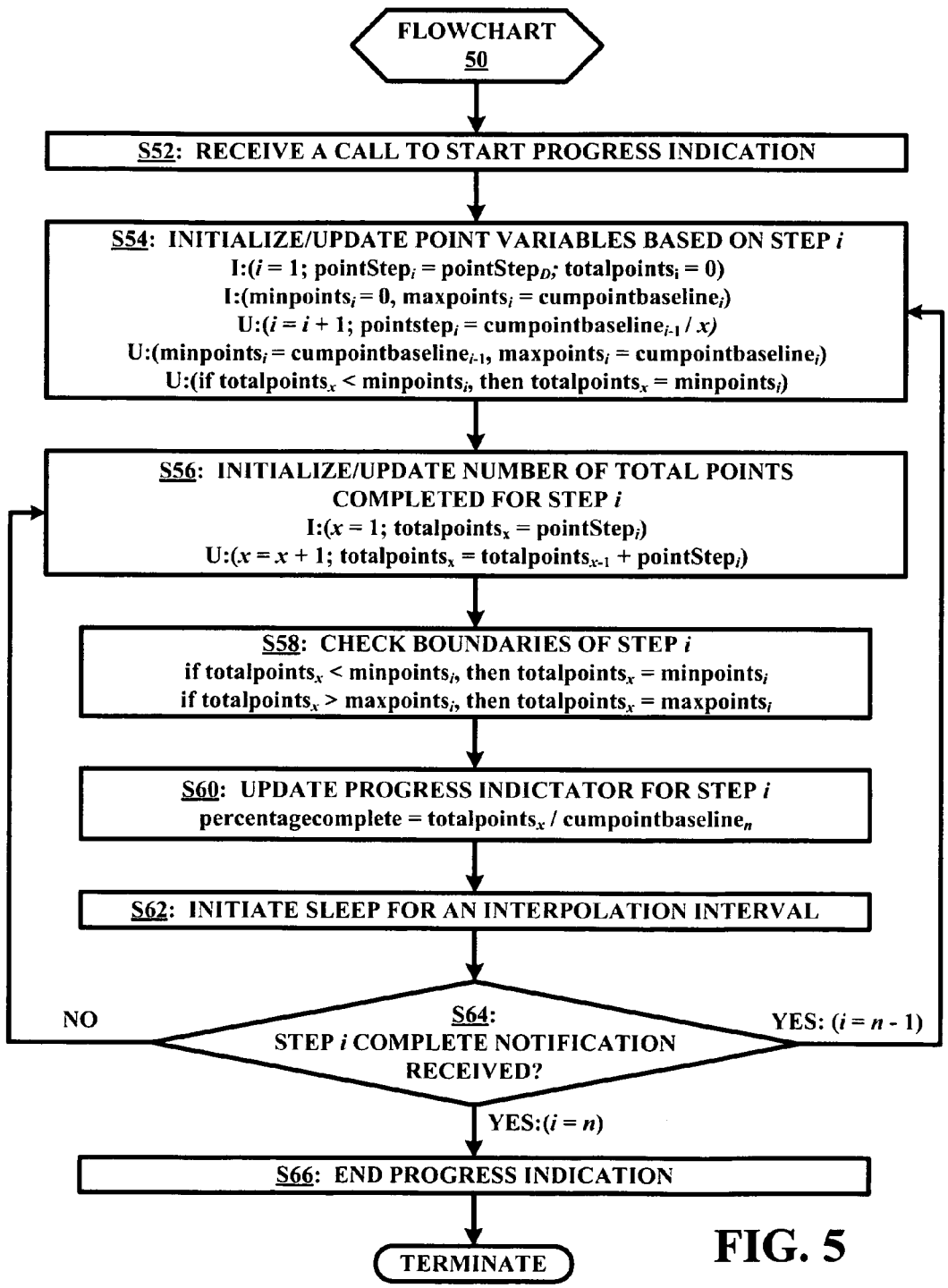
FIG. 5 illustrates a flowchart representative of one embodiment of a progress indicator regulation method in accordance with the present invention.

Referring to FIGS. 1 and 2, the present invention does not impose any limitations or any restrictions to the structural configurations of cumulative point agent 20 and progress indicator thread 21 in implementing respective stage S32 and S34 of flowchart 30. Thus, the following descriptions of a structural embodiment of cumulative point agent 20 for implementing stage S32 as shown in FIG. 3 and of a structural embodiment of progress point indicator 21 for implementing stage S34 as shown in FIG. 5 neither limits nor restricts the structural configuration of cumulative point agent 20 and progress indicator thread 21 in implementing respective stage S32 and S34 of flowchart 30.

FIG. 3 illustrates a flowchart 40 representative of a cumulative point baseline computation method of the present invention whereby cumulative point agent 20 is structurally configured with software, hardware and/or firmware for implementing flowchart 40.

A stage S42 of flowchart 40 encompasses cumulative point agent 20 identify a completion time baseline for each step of program installer 10. For example, as shown in FIG. 4, cumulative point agent 20 can generate a table 47 listing a completion time baseline of 10 seconds for step 1 of program installer 10, a completion time baseline of ten (10) seconds for step 1 of program installer 10, a completion time baseline of sixty (60) seconds for step 2 of program installer 10, a completion time baseline of thirty (30) seconds for step 3 of program installer 10, a completion time baseline of 100 seconds for step 4 of program installer 10 and a completion time baseline of forty (40) seconds for step 5 of program installer 10.

It is not essential to stage S42 that cumulative point agent 20 receive the completion time baseline for each step of program installer 10 as a fixed baseline for all subsequent implementations of stage S42. It is only essential to stage S42 that a desired set of completion time baselines be seeded to cumulative point agent 20 prior to any implementation of stage S42. Thus, the completion time baselines may or may not change with each implementation of stage S42.

A stage S44 of flowchart 40 encompasses cumulative point agent 20 computing completion time point for each step of program installer 10 as a product of the completion time baseline for the step and a baseline point factor (e.g., 1000 pts/second). For example, as shown in FIG. 4, cumulative point agent 20 can generate a table 48 with five entries. The first entry is 10,000 completion time points for step 1 of program installer 10 (i.e., a product of a completion time baseline of ten (10) seconds and a baseline point factor of 1000 pts/second). The second entry is 60,000 completion time points for step 2 of program installer 10 (i.e., a product of a completion time baseline of sixty (60) seconds and a baseline point factor of 1000 pts/second). The third entry is 30,000 completion time points for step 3 of program installer 10 (i.e., a product of a completion time baseline of thirty (30) seconds and a baseline point factor of 1000 pts/second). The fourth entry is 100,000 completion time points for step 4 of program installer 10 (i.e., a product of a completion time baseline of 100 seconds and a baseline point factor of 1000 pts/second). The fifth entry is 40,000 completion time points for step 5 of program installer 10 (i.e., a product of a completion time baseline of forty (40) seconds and a baseline point factor of 1000 pts/second).

It is not essential to stage S44 that baseline point factor be fixed for all implementations of stage S42. It is only essential to stage S44 that the baseline point factor be specified prior to any implementation of stage S44. Thus, the baseline point factor may or may not change with each implementation of stage S44.

A stage S45 of flowchart 40 encompasses cumulative point agent 20 computing a cumulative point baseline for each step of program installer 10 as a summation of completion time points for a step and any preceding steps. For example, as shown in FIG. 4, cumulative point agent 20 can generate a table 49 with five (5) entries. The first entry is a cumulative point baseline of 10,000 for step 1 of program installer 10 (i.e., completion time points 10,000 for step 1). The second entry is a cumulative point baseline of 70,000 for step 2 of program installer 10 (i.e., a summation of completion time points 60,000 and cumulative point baseline 10,000). The third entry is a cumulative point baseline of 100,000 for step 3 of program installer 10 (i.e., a summation of completion time points 30,000 and cumulative point baseline 70,000). The fourth entry is a cumulative point baseline of 200,000 for step 4 of program installer 10 (i.e., a summation of completion time points 100,000 and cumulative point baseline 100,000). The fifth entry is a cumulative point baseline of 240,000 for step 5 of program installer 10 (i.e., a summation of completion time points 40,000 and cumulative point baseline 200,000).

FIG. 5 illustrates a flowchart 50 representative of a progress indicator regulation method of the present invention whereby progress indicator thread 21 is structurally configured with software, hardware and/or firmware for implementing flowchart 50. A regulation of a progress indicator in view of table 49 shown in FIG. 4 will be described herein to facilitate an understanding of flowchart 50. From this description, those having ordinary skill in the art will appreciate how to apply the inventive principles of the present invention to more complex multi-step programs.

Referring to FIG. 5, a stage S52 of flowchart 50 encompasses progress indicator thread 21 receiving a call from program installer 10 to start a progress indication (e.g., a progress bar).

An initial execution of a stage S54 of flowchart 50 encompasses progress indicator thread 21 initializing various point variables for step 1 of program installer 10 in accordance with the following equations [1]-[5]:

$$i=1 \quad [1]$$

$$pointStep_i = pointStep_D \quad [2]$$

$$totalpoints_i = 0 \quad [3]$$

$$minpoints_i = 0 \quad [4]$$

$$maxpoints_i = cumpointbaseline_i \quad [5]$$

The $pointStep_D$ is a incremental point variable derived from a programmed interpolation interval that provides flowchart 50 with a fine grained interpolation of the progress indication. For example, if the interpolation interval is 500 milliseconds, then $pointStep_D$ can be 500 to represent 500 units of work every 500 milliseconds. It is not essential to stage S54 that the $pointStep_D$ and the interpolation interval have a fixed or known mathematical relationship. However, it is essential to stage S54 that progress indication thread 21 be programmed with the specified interpolation interval prior to its first execution of stage S54.

An initial execution of stage S56 of flowchart 50 encompasses progress indicator thread 21 initializes a number of total points completed for step 1 in accordance with the following equations [6] and [7]:

$$x=1 \quad [6]$$

$$totalpoints_x = pointStep_i \quad [7]$$

An initial execution of stage S58 of flowchart 50 encompasses progress indicator thread 21 checking the point boundaries for step 1 of program installer 1 in accordance with the following equations [7] and [8]:

if $totalpoints_x < minpoints_i$, then
$$totalpoints_x = minpoints_i \quad [8]$$

if $totalpoints_x > maxpoints_i$, then
$$totalpoints_x = maxpoints_i \quad [9]$$

An initial execution of a stage S60 of flowchart 50 encompasses progress indicator thread 21 updating the progress indicator for step 1 of program installer 1 in accordance with the following equation [10]:

$$percentagecomplete = totalpoints_x / cumpointbaseline_n \quad [10]$$

An initial execution of a stage S62 of flowchart 60 encompasses progress indicator thread 21 initiating a sleep for the interpolation interval whereby progress indicator thread will return to stages S56-S62 upon an expiration of the interpolation interval if progress indicator thread 21 did not receive a completion notification for step 1 from program installer 10 during the interpolation interval in accordance with a stage S64 of flowchart 50. A return to stage S56 involves an update of the number of total points completed for step 1 in accordance with the following equations [11] and [12]:

$$x = x+1 \quad [11]$$

$$totalpoints_x = totalpoints_{x-1} + pointStep_i \quad [12]$$

If progress indicator thread 21 did receive a completion notification for step 1 from program installer 10 during the interpolation interval, then progress indicator thread 21 returns to stage S54 to update the point variables for step 2 of program installer 10 in accordance with the following equations [13]-[16]:

$$i = i+1 \quad [13]$$

$$pointStep_i = cumpointbaseline_{i-1}/x \quad [14]$$

$$minpoints_i = cumpointbaseline_{i-1} \quad [15]$$

$$maxpoints_i = cumpointbaseline_i \quad [16]$$

Additionally, a minimum boundary check is performed to ensure the total number of points will at least equal the minimum points for the next step prior to increasing the total points during an execution of the next step by the updated incremental point variable, which may or may not have been readjusted in accordance with equation [14].

Thereafter, progress indicator thread 21 returns to stage S56 to update the total number of points in accordance with equations [11] and [12] for step 2 whereby stages S56-S62 will be repeated for step 2 until such time progress indicator thread 21 receives a completion notification for step 2 from program installer 10 to thereby return to stage S54 to update the points variables for step 3 of program installer 10.

Thereafter, progress indicator thread 21 returns to stage S56 to update the total number of points in accordance with equations [11] and [12] for step 3 whereby stages S56-S62 will be repeated for step 3 until such time progress indicator thread 21 receives a completion notification for step 3 from program installer 10 to thereby return to stage S54 to update the points variables for step 4 of program installer 10.

Thereafter, progress indicator thread 21 returns to stage S56 to update the total number of points in accordance with equations [11] and [12] for step 4 whereby stages S56-S62 will be repeated for step 4 until such time progress indicator thread 21 receives a completion notification for step 4 from program installer 10 to thereby return to stage S54 to update the points variables for step 5 of program installer 10.

Thereafter, progress indicator thread 21 returns to stage S56 to update the total number of points in accordance with equations [11] and [12] for step 5 whereby stages S56-S62 will be repeated for step 5 until such time progress indicator thread 21 receives a completion notification for step 5 from program installer 10 to thereby end the progress indication in accordance with a stage S66 of flowchart 50.

FIG. 6 illustrates an exemplary execution of flowchart 50 by progress indicator thread 21 in view of an interpolation interval of 500, a pointStep$_D$ of 500 points and a computing device capable of 500 units of work every 500 milliseconds.

As such, a completion time ("CT") of step 1 is ten (10) seconds with a cumulative completion time ("CCT") of ten (10) seconds. Over the ten (10) seconds, twenty (20) interpolation intervals x of 500 points increases the total points from 0 to 10,000 within points boundaries 0 and 10,000. The result is an increase in the percentage completion from 0.00% to 4.17% at a rate of 0.417% per second. In view of twenty (20) interpolation intervals x over the ten (10) seconds, the pointStep remains 500 for the next step 2.

A completion time ("CT") of step 2 is sixty (60) seconds with a cumulative completion time ("CCT") of seventy (70) seconds. Over the sixty (60) seconds, 120 additional interpolation intervals x of 500 points increases the total points from 10,000 to 70,000 within points boundaries 10,000 and 70,000. The result is an increase in the percentage completion from 4.17% to 29.17% at a rate of 0.417% per second. In view of the 120 interpolation intervals x over the sixty (60) seconds, the pointStep remains 500 for the next step 3.

A completion time ("CT") of step 3 is thirty (30) seconds with a cumulative completion time ("CCT") of 100 seconds. Over the thirty (30) seconds, sixty (60) additional interpolation intervals x of 500 points increases the total points from 70,000 to 100,000 within points boundaries 70,000 and 100,000. The result is an increase in the percentage completion from 29.17% to 41.67% at a rate of 0.417% per second. In view of sixty (60) interpolation intervals x over the thirty (30) seconds, the pointStep remains 500 for the next step 4.

A completion time ("CT") of step 4 is 100 seconds with a cumulative completion time ("CCT") of 200 seconds. Over the 100 seconds, 200 additional interpolation intervals x of 500 points increases the total points from 100,000 to 200,000 within points boundaries 100,000 and 1200,000. The result is an increase in the percentage completion from 41.67% to 83.33% at a rate of 0.417% per second. In view of 200 interpolation intervals x over the 100 seconds, the pointStep remains 500 for the final step 5.

A completion time ("CT") of step 5 is forty (40) seconds with a cumulative completion time ("CCT") of 240 seconds. Over the forty (40) seconds, eighty (80) additional interpolation intervals x of 500 points increases the total points from 200,000 to 240,000 within points boundaries 200,000 and 240,000. The result is an increase in the percentage completion from 83.33% to 100.00% at a rate of 0.417% per second.

FIG. 7 illustrates an exemplary execution of flowchart 50 by progress indicator thread 21 in view of an interpolation interval of 500, a pointStep$_D$ of 500 points and a computing device capable of 1,000 units of work every 500 milliseconds.

As such, a completion time ("CT") of step 1 is five (5) seconds with a cumulative completion time ("CCT") of five (5) seconds. Over the five (5) seconds, ten (10) interpolation intervals x of 500 points increases the total points from 0 to 5,000 within points boundaries 0 and 10,000. The result is an increase in the percentage completion from 0.00% to 2.08% at a rate of 0.417% per second. In view of ten (10) interpolation intervals x over the five (5) seconds, the pointStep increases from 500 to 1,000 for the next step 2. Also, in view of the update minimum boundary check, the total points will instantaneously increase from 5,000 to 10,000 for a percentage completion of 4.17% prior to variable computations for the next step 2.

A completion time ("CT") of step 2 is thirty (30) seconds with a cumulative completion time ("CCT") of thirty-five (35) seconds. Over the thirty (30) seconds, sixty (60) additional interpolation intervals x of 1,000 points increases the total points from 10,000 to 70,000 within points boundaries 10,000 and 70,000. The result is an increase in the percentage completion from 4.17% to 29.17% at an average rate of 0.833% per second. In view of the sixty (60) interpolation intervals x over the thirty (30) seconds, the pointStep remains 1,000 for the next step 3.

A completion time ("CT") of step 3 is fifteen (15) seconds with a cumulative completion time ("CCT") of fifty (50) seconds. Over the fifteen (15) seconds, thirty (30) additional interpolation intervals x of 1,000 points increases the total points from 70,000 to 100,000 within points boundaries 70,000 and 100,000. The result is an increase in the percentage completion from 29.17% to 41.67% at a rate of 0.833% per second. In view of thirty (30) interpolation intervals x over the fifteen (15) seconds, the pointStep remains 1,000 for the next step 4.

A completion time ("CT") of step 4 is fifty (50) seconds with a cumulative completion time ("CCT") of 100 seconds. Over the fifty (50) seconds, 100 additional interpolation intervals x of 1,000 points increases the total points from 100,000 to 200,000 within points boundaries 100,000 and 200,000. The result is an increase in the percentage completion from 41.67% to 83.33% at a rate of 0.833% per second. In view of 100 interpolation intervals x over the fifty (50) seconds, the pointStep remains 1,000 for the final step 5.

A completion time ("CT") of step 5 is twenty (20) seconds with a cumulative completion time ("CCT") of 120 seconds. Over the twenty (20) seconds, forty (40) additional interpolation intervals x of 1,000 points increases the total points from 200,000 to 240,000 within points boundaries 200,000 and 240,000. The result is an increase in the percentage completion from 83.33% to 100.00% at a rate of 0.833% per second.

FIG. 8 illustrates an exemplary execution of flowchart 50 by progress indicator thread 21 in view of an interpolation interval of 500, a pointStep$_D$ of 500 points and a computing device capable of 250 units of work every 500 milliseconds.

As such, a completion time ("CT") of step 1 is twenty (20) seconds with a cumulative completion time ("CCT") of twenty (20) seconds. Over the twenty (20) seconds, forty (40) interpolation intervals x of 500 points increases the total points from 0 to 10,000 within points boundaries 0 and 10,000. The result is an increase in the percentage completion from 0.00% to 0.417% at a rate 0.417% per second for the first ten (10) seconds and remains at 0.417% for the remaining ten (10) seconds. In view of forty (40) interpolation intervals x over the five (5) seconds, the pointStep decreases from 500 to 250 for the next step 2.

A completion time ("CT") of step 2 is 120 seconds with a cumulative completion time ("CCT") of 140 seconds. Over the 120 seconds, 240 additional interpolation intervals x of 250 points increases the total points from 10,000 to 70,000 within points boundaries 10,000 and 70,000. The result is an increase in the percentage completion from 0.417% to 29.17% at an average rate of 0.104% per second. In view of the 240 interpolation intervals x over the 120 seconds, the pointStep remains 250 for the next step 3.

A completion time ("CT") of step 3 is sixty (60) seconds with a cumulative completion time ("CCT") of 200 seconds. Over the sixty (60) seconds, 120 additional interpolation intervals x of 250 points increases the total points from 70,000 to 100,000 within points boundaries 70,000 and 100,000. The result is an increase in the percentage completion from 29.17% to 41.67% at a rate of 0.208% per second. In view of 120 interpolation intervals x over the sixty (60) seconds, the pointStep remains 250 for the next step 4.

A completion time ("CT") of step 4 is 200 seconds with a cumulative completion time ("CCT") of 400 seconds. Over the 200 seconds, 400 additional interpolation intervals x of 250 points increases the total points from 100,000 to 200,000 within points boundaries 100,000 and 200,000. The result is an increase in the percentage completion from 41.67% to 83.33% at a rate of 0.208% per second. In view of 400 interpolation intervals x over the 200 seconds, the pointStep remains 250 for the final step 5.

A completion time ("CT") of step 5 is eighty (80) seconds with a cumulative completion time ("CCT") of 480 seconds. Over the eighty (80) seconds, 160 additional interpolation intervals x of 250 points increases the total points from 200,000 to 240,000 within points boundaries 200,000 and 240,000. The result is an increase in the percentage completion from 83.33% to 100.00% at a rate of 0.208% per second.

Referring to FIGS. 6-8, those having ordinary skill in the art will appreciate the interpolation value of the incremental point variable pointStep in facilitating a readjustment in the rate per second at which the progress bar is monotonically increased to thereby reflect a smooth and finely tuned progress bar representative of a true execution of program installer 10. Those having ordinary skill in the art will further appreciate the examples of FIGS. 7 and 8 were provided in view of a uniform execution of the multi-step program for purposes of facilitating an understanding an uncomplicated readjustment in the rate per second at which the progress bar is monotonically increased. Typically, a non-uniform execution of the multi-step program is expected in view of many processing and memory factors as would be appreciated by those having ordinary skill in the art. As such, numerous readjustments in the rate per second at which the progress bar is monotonically increased will occur during most if not all steps in the execution of the multi-step program as will be appreciated by those having ordinary skill in the art.

Figure 9:
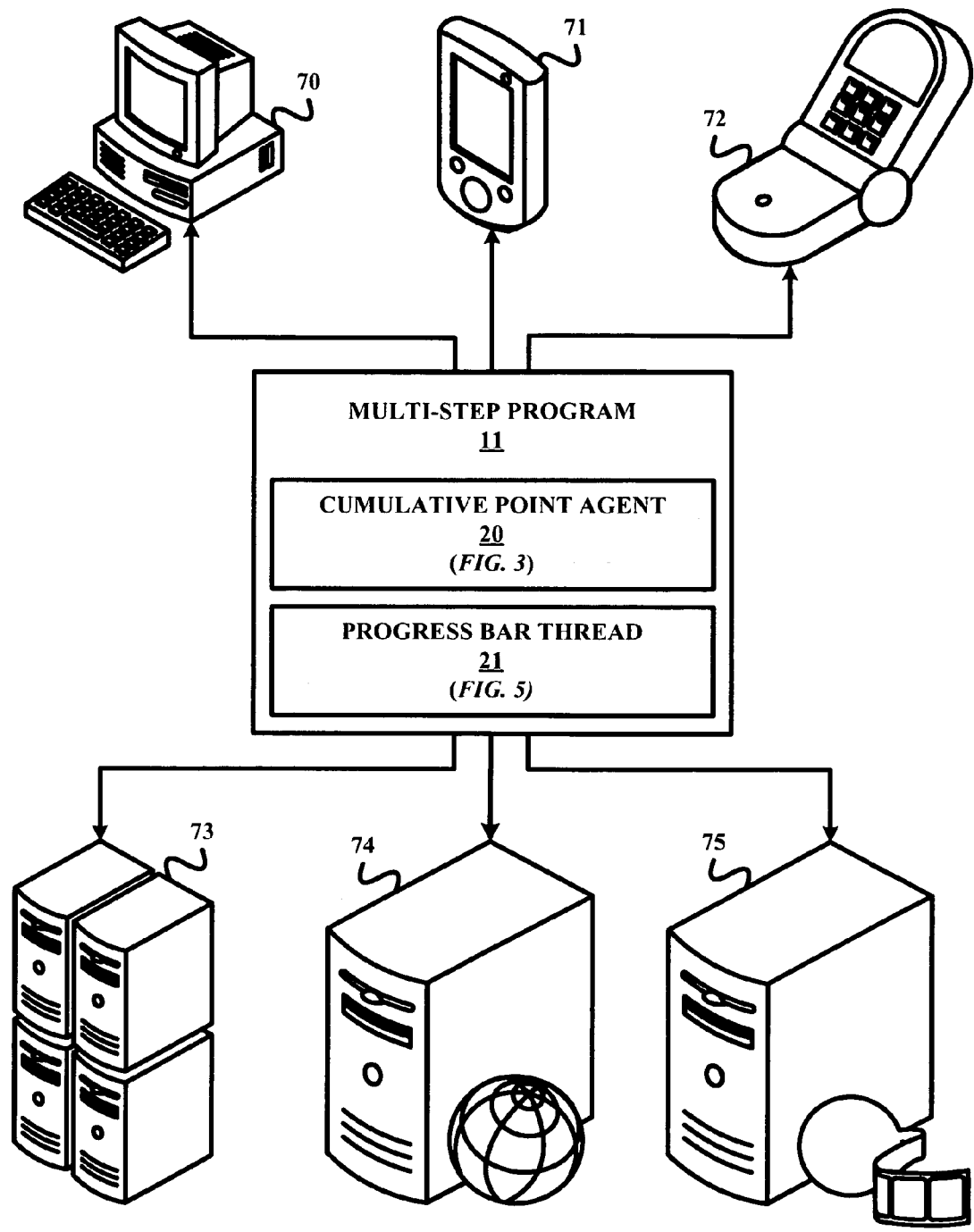
FIG. 9 illustrate exemplary installation of the multi-step program illustrated in FIG. 1 into various computing devices in accordance with the present invention.

Referring to FIG. 9, in one practical embodiment, program installer 10 and any other multi-step program employing cumulative point agent 21 and progress bar thread 21 can be written as software instructions in any programming language and stored in a memory of any computing device (e.g., a workstation 70, a personal data assistant 71, a mobile phone 72, an application server 73, a web server 74 and a streaming media server 75 as shown) whereby a process of the computing device can execute the software instructions as needed.

Referring to FIGS. 1-9, those having ordinary skill in the art will further appreciate the numerous advantages of the present invention including, but not limited to, the ability to apply the inventive principles to an execution of any type multi-step program by any type of computing device.

Those having ordinary skill in the art of progress indicator techniques may develop other embodiments of the invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

I claim:

1. A method for readjusting and interpolating a progress of an execution of multi-step program by a computing device, the method comprising:

computing a cumulative point baseline for each step of the multi-step program based on a completion time baseline for each step of the multi-step program wherein the cumulative point baseline comprises a total number of units of work required to complete a step of the multi-step program and any preceding steps of the multi-step program wherein a point is a base unit of an application program installation that can be accomplished by the multi-step program in a specified amount of time, and wherein the computing of the cumulative point baseline for each step of the multi-step program based on the completion time baseline for each step of the multi-step program includes:

identifying a first completion time baseline for a first step of the multi-step program, wherein the first completion time baseline comprises data informative of an actual completion time for executing each step of the multi-step program as run on a baseline machine;

computing a first completion time point as a product of the first completion time baseline and a baseline point value; and computing a first cumulative point baseline equal to the first completion time point; and regulating a progress indicator based on the cumulative point baseline and a completion time of each step of the multi-step program as executed by the computing device, wherein the progress indicator is a progress bar, wherein the regulating of the progress indicator based on the cumulative point baseline and the completion time of each step of the multi-step program as executed by the computing device includes:

initializing an incremental point variable for a first step of the multi-step program; and initializing and updating a total points for the first step based on the incremental point variable in response to each expiration of an interpolation interval during a completion time of the first step.

2. The method of claim 1, wherein the computing of the cumulative point baseline for each step of the multi-step program based on the completion time baseline for each step of the multi-step program further includes: identifying a second completion time baseline for a second step of the multi-step program wherein the second completion time baseline comprises data informative of an actual completion time for executing each step of the multi-step program as run on a baseline machine; computing a second completion time points as a product of the second completion time baseline and the baseline point value; and computing a second cumulative point baseline as a summation of the first completion time points and the second completion time points.

3. The method of claim 1, wherein the regulating of the progress indicator based on the cumulative point baseline and the completion time of each step of the multi-step program as executed by the computing device includes: checking point boundaries for the first step as the total points are initialized and updated for the first step based on the incremental point variable in response to each expiration of the interpolation interval during the completion time of the first step.

4. The method of claim 3, wherein the regulating of the progress indicator based on the cumulative point baseline and the completion time of each step of the multi-step program as executed by the computing device further includes: updating the incremental point variable for a second step of the multi-step program based on a cumulative point baseline of the first step and a total number of expirations of the interpolation interval during the completion time of the first step.

5. A method for readjusting and interpolating a progress of an execution of multi-step program by a computing device, the method comprising:

executing the multi-step program on a baseline machine;

identifying a first completion time baseline for a first step of the multi-step program based on the execution, computing a first completion time point as a product of the first completion time baseline and a baseline point value; and computing a first cumulative point baseline equal to the first completion time point; computing a cumulative point baseline for each step of the multi-step program based on a completion time baseline for each step of the multi-step program wherein the cumulative point baseline comprises a total number of units of work required to complete a step of the multi-step program and any preceding steps of the multi-step program wherein a point is a base unit of an application program installation that can be accomplished by the multi-step program in a specified amount of time;

executing the multi-step program on the computing device; and regulating a progress indicator based on the cumulative point baseline and a completion time of each step of the multi-step program as executed by the computing device, wherein the progress indicator is a progress bar, wherein the regulating of the progress indicator based on the cumulative point baseline and the completion time of each step of the multi-step program as executed by the computing device includes:

initializing an incremental point variable for a first step of the multi-step program; and initializing and updating a total points for the first step based on the incremental point variable in response to each expiration of an interpolation interval during a completion time of the first step.

\* \* \* \* \*